(12) United States Patent
Nema et al.

(10) Patent No.: US 10,038,596 B2
(45) Date of Patent: Jul. 31, 2018

(54) HOST PROFILES IN A STORAGE AREA NETWORK (SAN) ARCHITECTURE

(71) Applicant: VMware, Inc., Palo Alto, CA (US)

(72) Inventors: Kanika Nema, Pune (IN); Erik Cota-Robles, Kirkland, WA (US)

(73) Assignee: VMWARE, INC., Palo Alto, CA (US)

(*) Notice: Subject to any disclaimer, the term of this patent is extended or adjusted under 35 U.S.C. 154(b) by 324 days.

(21) Appl. No.: 14/493,917

(22) Filed: Sep. 23, 2014

(65) Prior Publication Data

US 2016/0087843 A1 Mar. 24, 2016

(51) Int. Cl.
G06F 15/177 (2006.01)
H04L 12/24 (2006.01)
H04L 29/08 (2006.01)
G06F 9/4401 (2018.01)

(52) U.S. Cl.
CPC ........ *H04L 41/0869* (2013.01); *G06F 9/4416* (2013.01); *H04L 67/1097* (2013.01)

(58) Field of Classification Search
CPC ........ H04N 1/603; H04N 1/60; H04N 1/6097; H04N 1/6019; H04N 1/6058; H04L 67/14; H04L 67/303; H04L 2012/2849; H04L 12/1881; H04L 12/2805; H04L 12/2807; H04L 12/2834; H04L 12/5855; H04L 29/02; H04L 29/04
See application file for complete search history.

(56) References Cited

U.S. PATENT DOCUMENTS

| | | | |
|---|---|---|---|
| 6,421,777 B1* | 7/2002 | Pierre-Louis | G06F 9/4416 713/2 |
| 2003/0105979 A1* | 6/2003 | Itoh | H04L 12/5855 726/24 |
| 2005/0055575 A1* | 3/2005 | Evans | H04L 41/0809 726/4 |
| 2007/0192466 A1* | 8/2007 | Nahum | G06F 9/4416 709/223 |
| 2008/0294888 A1* | 11/2008 | Ando | G06F 8/63 713/2 |
| 2010/0049823 A1* | 2/2010 | Saigo | G06F 11/2066 709/216 |
| 2013/0282996 A1* | 10/2013 | Kalos | H04L 29/08 711/161 |
| 2014/0380295 A1* | 12/2014 | Chen | G06F 8/65 717/170 |

* cited by examiner

*Primary Examiner* — Shean Tokuta
*Assistant Examiner* — Thao Duong (57) ABSTRACT

Reference profiles for managing configurations of host machines in a cluster may include a subprofile that specifies a boot LUN in a SAN storage architecture. Processing of a reference profile includes properly resolving the boot LUN specified in the reference profile and the actual boot LUN used in a target host machine.

22 Claims, 11 Drawing Sheets

HOST PROFILES IN A STORAGE AREA NETWORK (SAN) ARCHITECTURE

BACKGROUND

Virtual machine computing environments are often used to implement datacenters to enable information technology (IT) organizations to deliver flexible and reliable IT services. However, as the infrastructure in a virtual machine (VM) computing environment expands to meet the growing needs of a datacenter, it can become increasingly difficult and time consuming to configure multiple host machines in similar ways. Existing per-host processes typically involve repetitive and error-prone configuration steps. As a result, maintaining configuration consistency and correctness across a datacenter requires increasing amounts of time and expertise, leading to increased operational costs.

A tool called "host profiles" can facilitate the installation and management of a complex virtual machine computing environment. Host profiles capture the blueprint of a known, validated reference host configuration, including components such as networking, storage, security, and other settings. Host profiles enable a system administrator in a datacenter to establish standard configurations for host machines, and to automate compliance to these configurations, simplifying operational management of large-scale environments and reducing errors caused by misconfigurations.

Host profiles can replace per-host, manual or UI-based host configuration, and maintain configuration consistency and correctness across the datacenter. Host profiles allow the system administrator to automate host configuration across a large number of hosts and clusters and thus reduce the time spent on configuring and deploying new host machines. Host profiles facilitate monitoring for host configuration errors and deviations, detect and report configuration errors so that remedial action can be taken.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein. The embodiments disclosed herein relate to virtual machines and virtual machine environments. It will be apparent to those of ordinary skill, however, that other embodiments in accordance with the present disclosure include non-virtual machine environments.

Figure 1:
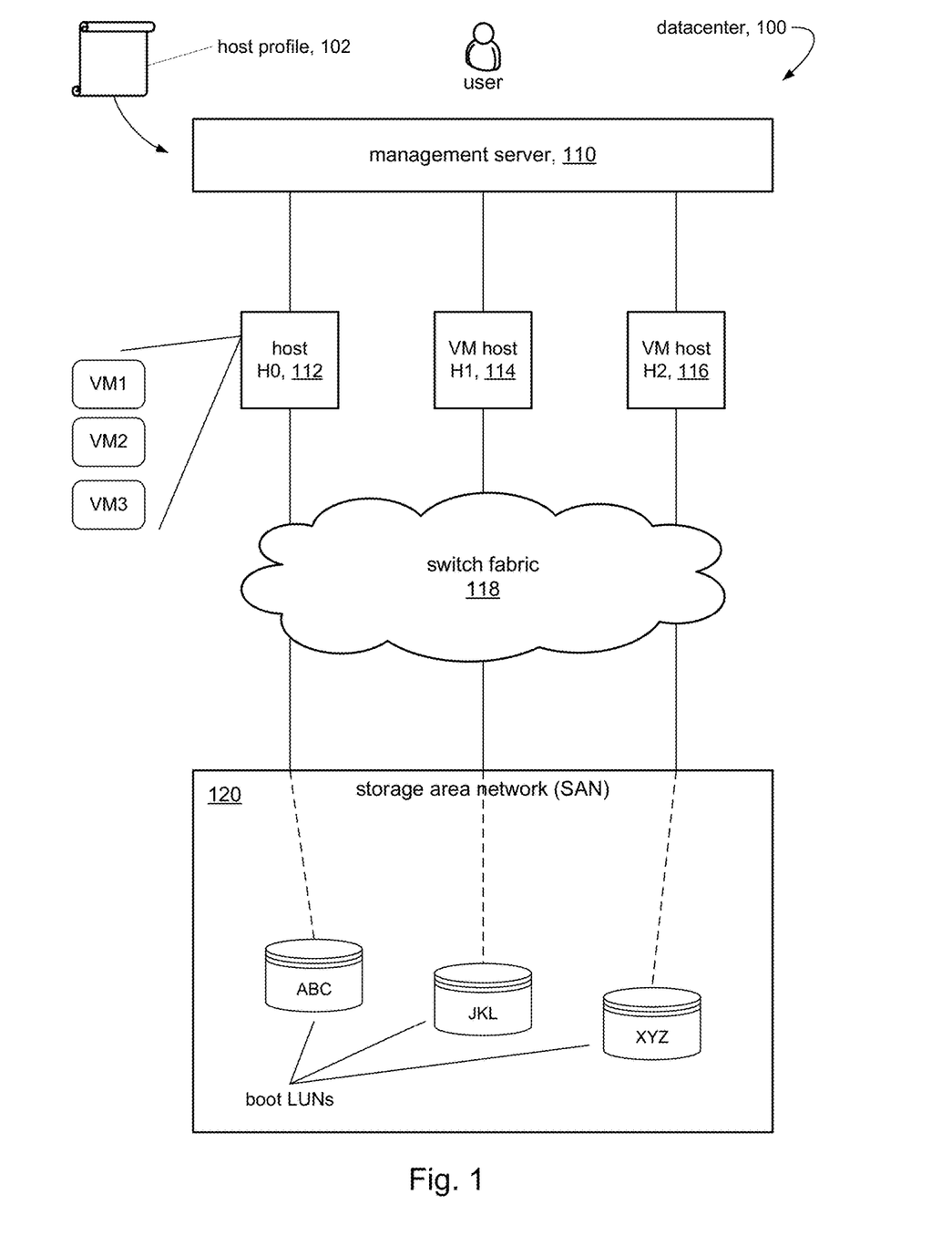
FIG. 1 depicts a high level cluster of host machines in a datacenter.

FIG. 1 illustrates an embodiment of a virtual machine computing environment in a datacenter 100 in accordance with the present disclosure. The datacenter 100 may comprise a management server 110 to manage host machines 112, 114, 116 that host virtual machines comprising the virtual machine computing environment. In particular embodiments, the management server 110 may facilitate the management of the datacenter 100, including managing a host profile 102. In various embodiments, the management server 110 may perform one or more of generating the host profile 102, using the host profile to configure host machines, using the host profile to assess compliance of host machines, and the like. The management server 110 may provide services such as access control, configuration, performance monitoring, and the like. The vCenter® management system by Vmware, Inc. is an example of a management server 110.

The datacenter 100 may further comprise a switch fabric 118. In various embodiments, for example, the switch fabric 118 may be any suitable public or private communication network, and in some embodiments may include public and private elements. The storage system 120 in the datacenter 100 may include a storage area network (SAN). In various embodiments the datacenter 100 may comprise any suitable storage architecture or combination of storage architectures, including for example, but not limited to fibre channel storage arrays, iSCSI storage arrays, NAS storage arrays, etc. The host machines 112-116 may be grouped together with connections to the same switch fabric 118 and storage system 120 to provide an aggregate set of resources in a virtual environment, sometimes referred to as a "cluster."

Figure 2:
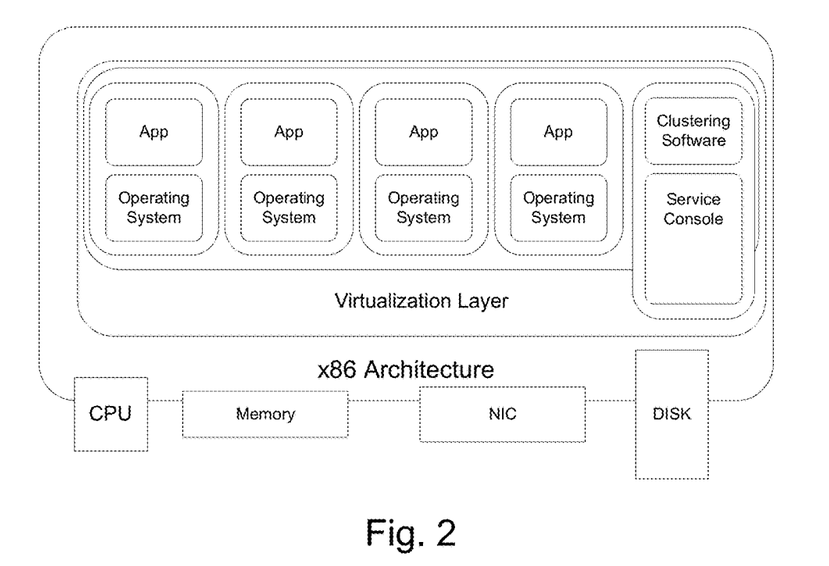
FIG. 2 is a block diagram illustrating components in a host machine.

Each host machine 112-116 may host one or more virtual machines (e.g., VM1, VM2, VM3). Referring for a moment to FIG. 2, a host machine may comprise a computer system having standard hardware components such as a CPU, main memory (e.g., DRAM), network interface card (NIC), and local disk storage. A software layer called the "virtualization layer" has direct access to the underlying hardware and presents a hardware interface that appears to be a machine (virtual machine) on which an operating system (sometimes referred to as a "guest OS") may be installed along with subsequent applications. The ESXi® server provided by Vmware, Inc. is an example of a virtualization layer.

Returning to FIG. 1, in a particular embodiment, the storage system 120 may use a SAN storage architecture. Disks on a SAN are sometimes referred to as logical unit number (LUN) disks or LUN devices. In the SAN architecture, each LUN disk is "seen" by each host machine 112-116. In other words, each LUN disk is accessible by each host machine and thus can be shared across the cluster. In a typical SAN architecture, the boot disk also resides on the SAN. A boot disk (also referred to as a startup disk) contains files (e.g., the OS) that are used to start a host machine. On the SAN, a boot disk may be referred to as a "boot LUN." Because a boot LUN is used to start a host machine, each host machine 112-116 has its own corresponding boot LUN, and is typically not accessible (or "seen") by the other host machines. In the embodiment shown in FIG. 1, for example, host machine 112 is associated with the boot LUN identified as "ABC," host machine 114 is associated with the boot LUN identified as "JKL," and host machine 116 is associated with the boot LUN identified as "XYZ." Since these LUNs are designated as boot disks, they are configured so they can only be seen by their respective host machines; although, in a configuration where they are not designated as being boot disks, they can be shareable among host machines 112-116.

Figure 3:
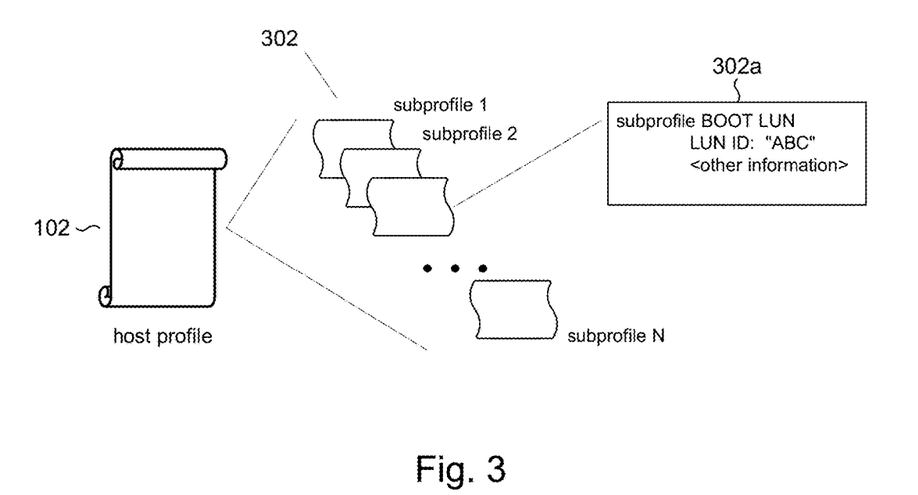
FIG. 3 illustrates aspects of a host profile in accordance with the present disclosure.

As noted above, the configuration of each host machine 112-116 may be captured and stored in a corresponding host profile 102. In some embodiments, the host profile 102 may include configuration details about each specific configuration settings. Referring to FIG. 3, the host profile 102 may comprise subprofiles 302. Each subprofile may specify the configuration of an element comprising the corresponding host machine. Merely as examples, and by no means exhaustive, configurable elements in a host machine whose settings may be captured in a host profile include elements such as memory, storage, network communications, date and time, firewall protection, user accounts, user groups, and so on. Settings may include, for example, amount of memory, names of disks, network addresses, account names, and so on.

In accordance with the present disclosure, the host profile 102 may include configuration information relating to the boot disk to accommodate configurations that use SAN storage. Thus, for example, the host profile 102 may include a subprofile 302a that indicates the subprofile relates to a BOOT LUN for the corresponding host machine. The subprofile 302a may include information, in addition to other information, that identifies the BOOT LUN using a suitable identifier, for example, "ABC."

Figure 4:
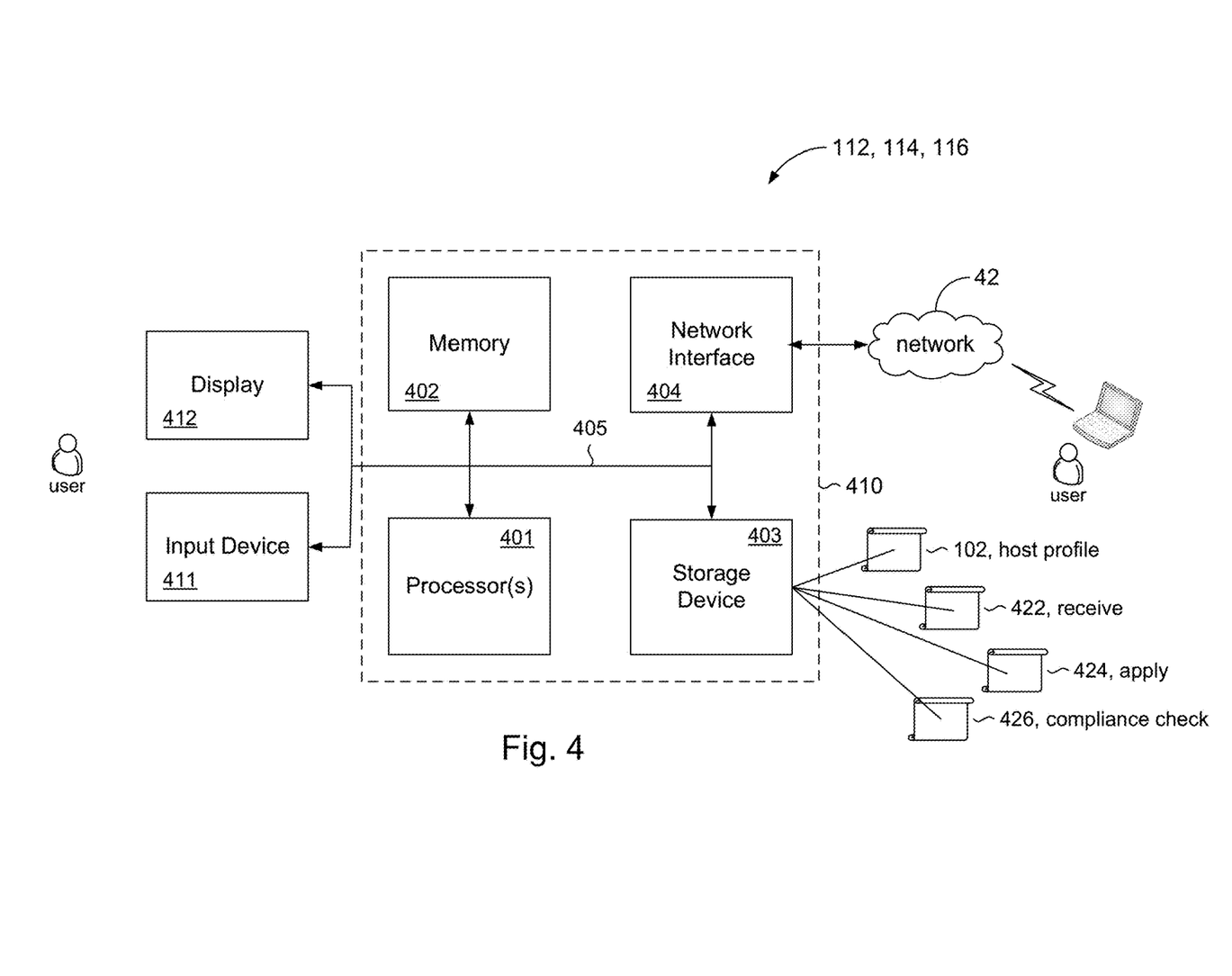
FIG. 4 is a block diagram illustrating components in the host computers shown in FIG. 1.

Refer now to FIG. 4 for a brief description of an illustrative implementation of host machines 112-116. A host machine may include a computer 410 connected to I/O devices, such as display 412 and suitable input device(s) 411 such as a keyboard, a mouse, and so on to allow an administrative user to access the host machine (e.g., for maintenance purposes). The computer 410 may include a processor component 402 that comprise a single processor (e.g., central processing unit, CPU) or a configuration of many processors. A memory component 402 may include dynamic memory (e.g., DRAM) and static memory (e.g., flash memory).

A storage device component 403 may provide read/writeable mass storage capability (e.g., hard disk drives) and/or read-only storage (e.g., CD discs). The storage device component 403 may store the host profile 102. The storage device component 403 may store computer executable program code (e.g., applications 422, 424, 426) which when executed by the processor component 401 cause the processor component to perform various actions disclosed herein. The computer executable program code may include, for example, executable code to receive the host profile, executable code to apply the host profile to configure a host machine, and executable code to conduct compliance checking using the host profile to assess configurations of host machines.

The computer 410 may be connected to suitable network interface component 404 for communication over a suitable communication network 42, such as a local network or a public access network. Users may access the host machine locally via I/O devices 411, 412, or remotely via the communication network 42. A system bus 405 may provide control and/or data bus lines to interconnect these elements.

Figure 4A:
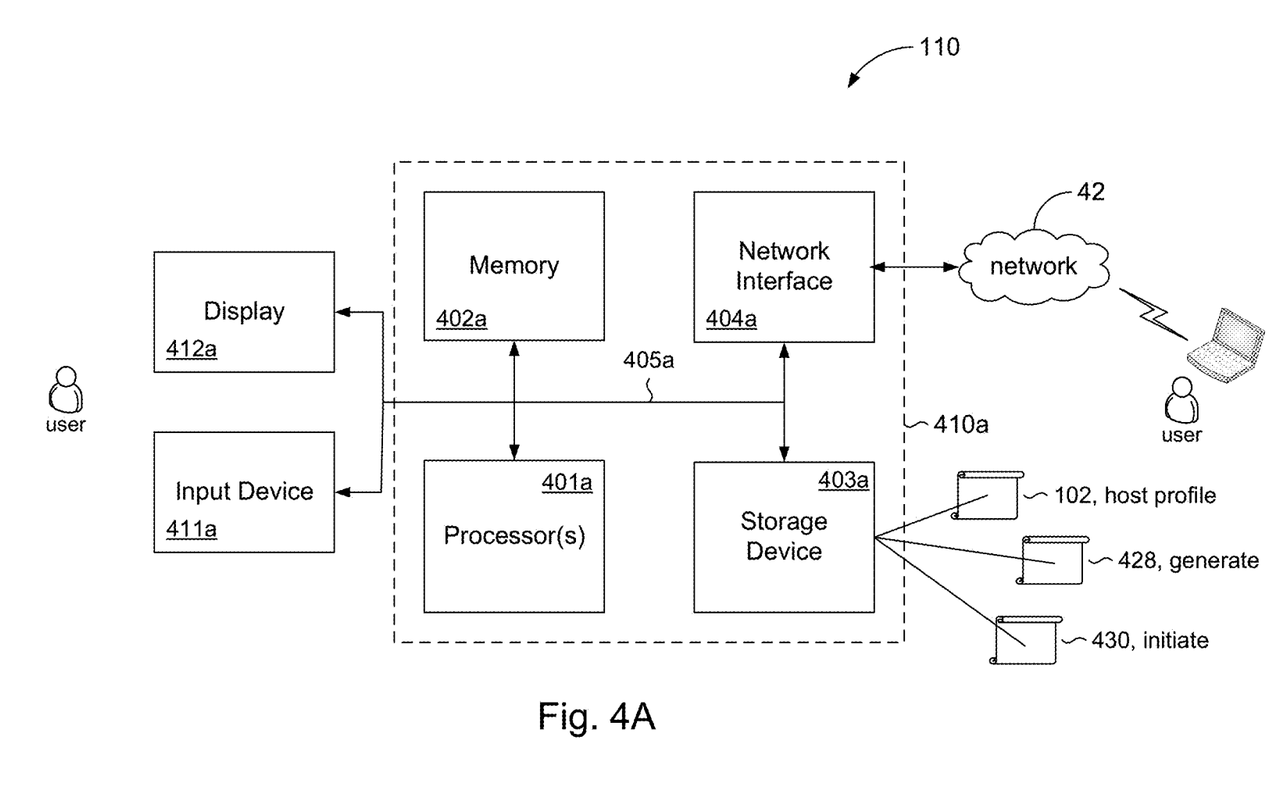
FIG. 4A is a block diagram illustrating components in a management server shown in FIG. 1.

Refer now to FIG. 4A for a brief description of a specific embodiment of management server 110. In particular embodiments, the management server 110 may facilitate the management of the datacenter 100, including managing the host profile 102. In various embodiments, the management server 110 may perform one or more of generating the host profile 102, using the host profile to configure host machines, using the host profile to assess compliance of host machines, and the like.

The management server 110 may include a computer 410a connected to I/O devices, such as display 412a and suitable input device(s) 411a such as a keyboard, a mouse, and so on to allow an administrative user to access the management server. The computer 410a may include a processor component 402a that comprise a single processor (e.g., central processing unit, CPU) or a configuration of many processors. A memory component 402a may include dynamic memory (e.g., DRAM) and static memory (e.g., flash memory).

A storage device component 403a may provide read/write-able mass storage capability (e.g., hard disk drives) and/or read-only storage (e.g., CD discs). The storage device component 403a may store the host profile 102. The storage device component 403a may store computer executable program code (e.g., applications 428 and 430) which when executed by the processor component 401a cause the processor component to perform various actions disclosed herein. The computer executable program code may include, for example, executable code to generate the host profile and executable code to initiate compliance checking using the host profile to assess configurations of host machines.

The computer 410a may be connected to suitable network interface component 404a for communication over a suitable communication network 42, such as a local network or a public access network. Users may access the management server 110 locally via I/O devices 411 a, 412a, or remotely via the communication network 42. A system bus 405a may provide control and/or data bus lines to interconnect these elements.

Figure 5A:
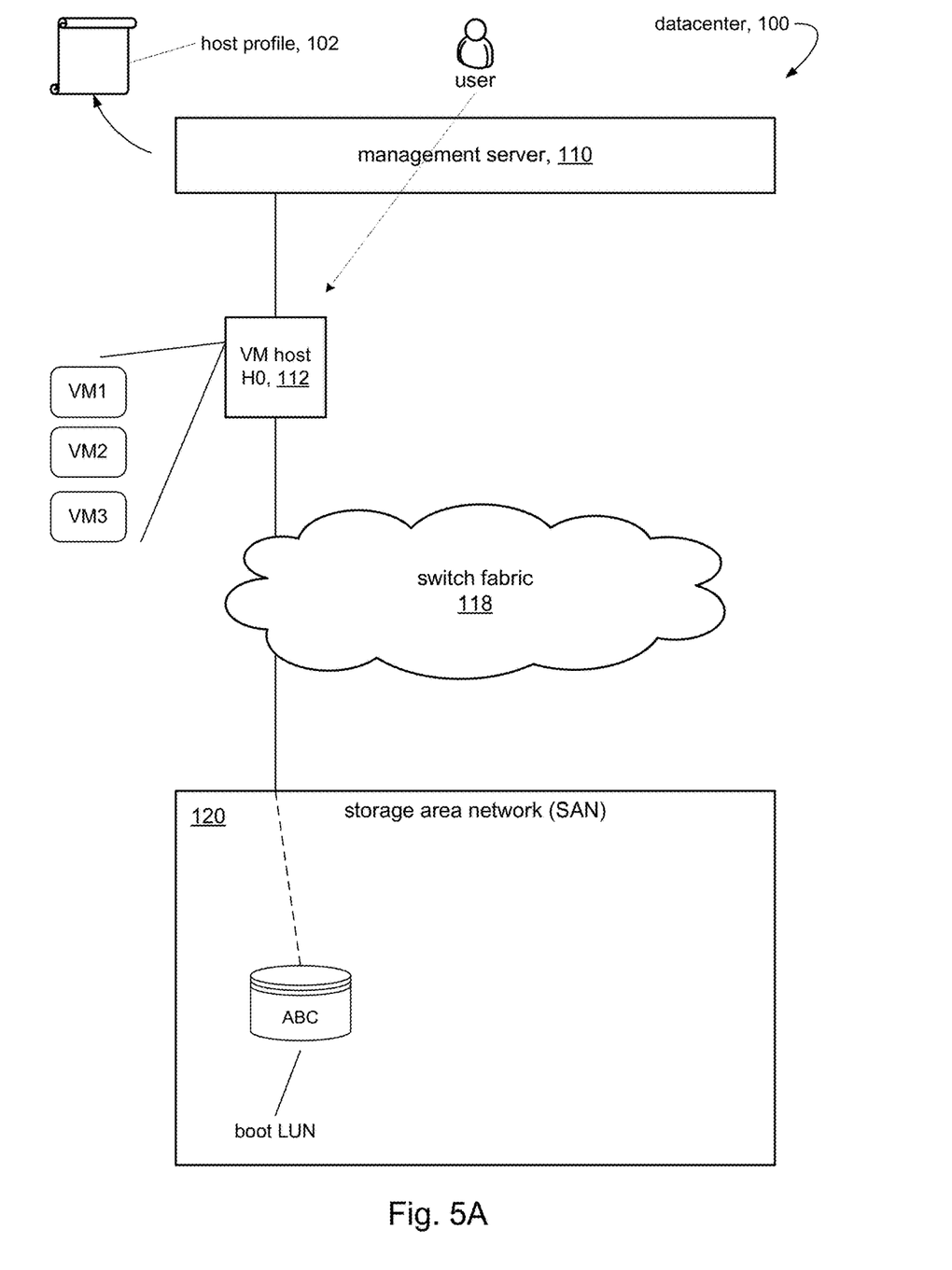
FIGS. 5A and 5B illustrate the use of a host profile.

FIG. 5A depicts a user (e.g., administrative user) configuring an initial host machine 112 using the management server 110. The configuration process may include, for example, identifying and configuring elements in the host machine 112, identifying and configuring elements in the switch fabric 118, and identifying and configuring elements in the storage system 120. In the case of a SAN storage architecture, the configuration process may include identifying and designating a LUN in the SAN as being the boot LUN for the host machine 112 (e.g., LUN "ABC"). In some embodiments, the host machine 112 may first be physically installed in the datacenter 100, and then subsequently configured for operation in the virtual environment. The physical installation may include defining the boot disk, which, in the case of a SAN, may include defining a LUN on the SAN to server as a boot LUN, and installing a boot image on the boot LUN. The boot LUN may then be configured so that it is visible only to host machine 112.

The user may cause the management server 110 to create the host profile 102. For example, the user may invoke an application (e.g., 428, FIG. 4A) on the management server 110 to generate the host profile 102. Creating or otherwise generating the host profile 102 may include the management server 102 retrieving and encapsulating the configuration data stored in the host machine 112 into a suitable format. In some embodiments, the process may be automated. In other embodiments, the process may be interactive with the user to guide the process. The generated host profile 102 may be stored on the management server 110 and later serve as a reference ("reference profile") for configuring subsequent host machines. The host machine 112 that was used to generate the host profile may be referred to as the "reference host."

Additional host machines (e.g., 114, 116) may be installed and configured. As noted above, a host machine may first be physically installed as explained above. Next, might be configuration of the host machine for operation in the virtual environment. In some embodiments, the user (e.g., administrative user) may manually configure the installed host machine. In other embodiments, the management server 110 may use the host profile 102 as a reference to configure the installed host machine. For example, the management server 110 may have an application (e.g., 424, FIG. 4) that the user can invoke to configure host machines in a fully automated manner, or may interact with the user to conduct the configurations.

Figure 5B:
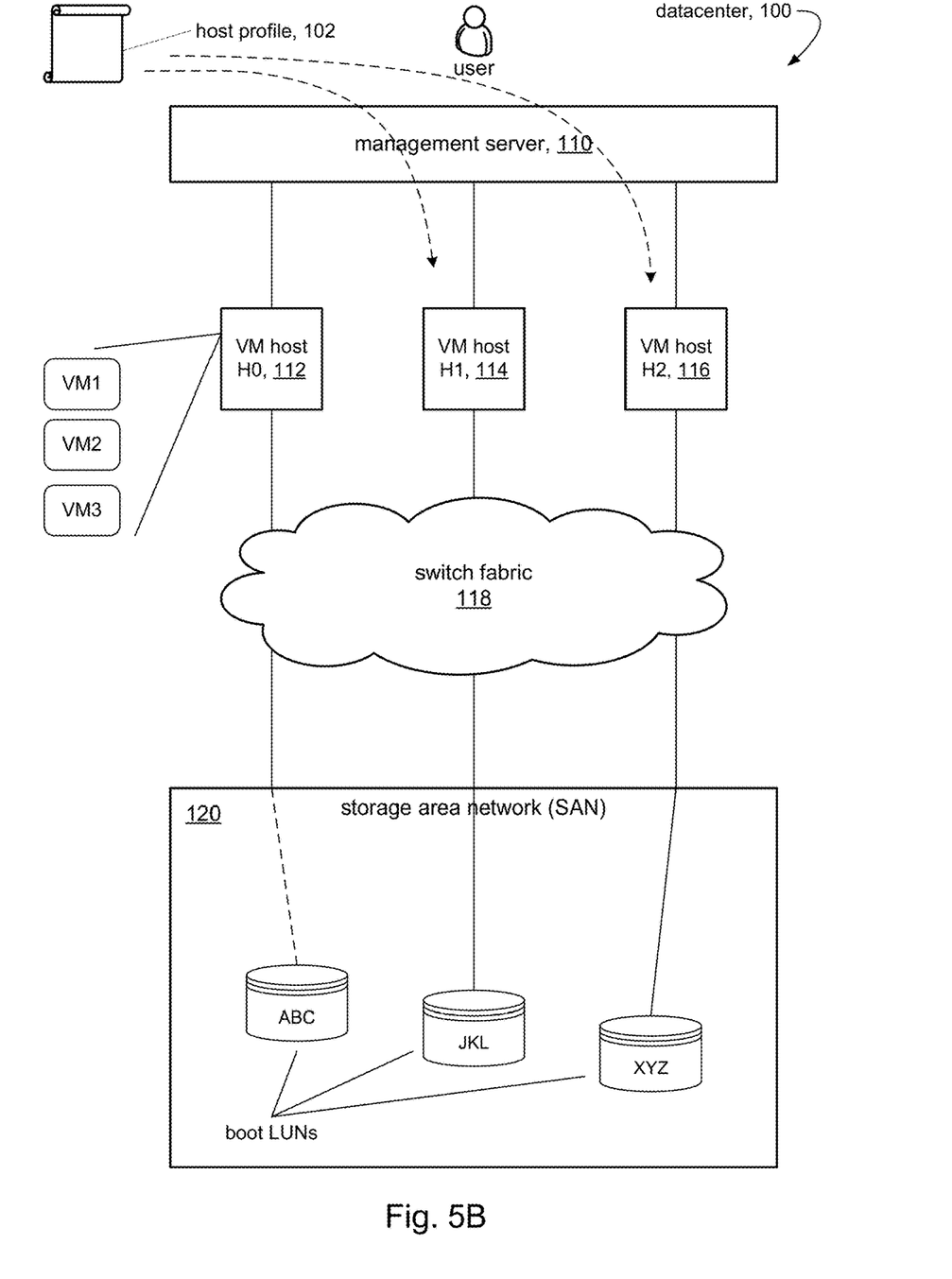

FIG. 5B depicts a user (e.g., administrative user) using the host profile 102 to monitor the configuration of host machines (e.g., 114, 116) in the datacenter 100. In some embodiments, the management server 110 may include an application (e.g., 430, FIG. 4A) that can be manually invoked by the user to monitor one or more host machines for compliance using the configuration data that comprises the host profile 102 as a reference. In some embodiments, compliance checking involves the management sever 110 sending the host profile 102 to each to each host machine and instructing the host machine to conduct a compliance workflow. Such host-centric embodiments can easily scale to large numbers of host machines, which may be desirable in datacenters that have hundreds to thousands of host machines.

In other embodiments, compliance checking may involve the management sever 110 accessing the configuration information from the host machine on which compliance checking it to performed (target host), and comparing the accessed configuration against the configuration data of the host profile 102. Such management server-centric embodiments may be suitable in smaller installations.

The management server 110 may receive reports of deviations of configurations in a host machine from configurations in the host profile 102, and log such deviations. The management server 110 may throw warning or error messages to inform a system administrator. In other embodiments, the management server 110 may autonomously take remedial action.

Consider, the example configuration shown in FIG. 1. The datacenter 100 uses a SAN storage architecture, the host machine 112 boots off of its own boot disk, which exists as a LUN device on the SAN and is identified as LUN "ABC." Accordingly, the host profile 102 created from host machine 112 specifies a boot LUN of "ABC." Host machines 114 and 116 boot off of their own boot disks, which exist as LUN devices on the SAN and are respectively identified as LUN "JKL" and LUN "XYZ." It can be appreciated that a compliance check of host machines 114, 116 using host profile 102 will generally fail due to the discrepancy between the boot LUN specified in the host profile 102, namely LUN "ABC," and the boot LUNs in host machines 114, 116, identified respectively as "JKL" and "XYZ." The difference in boot LUNs can be erroneously reported to the management server 110 as a deviation. The discussion will now turn to a description of processing host profiles in accordance with the present disclosure to avoid such erroneous reporting.

Figure 6:
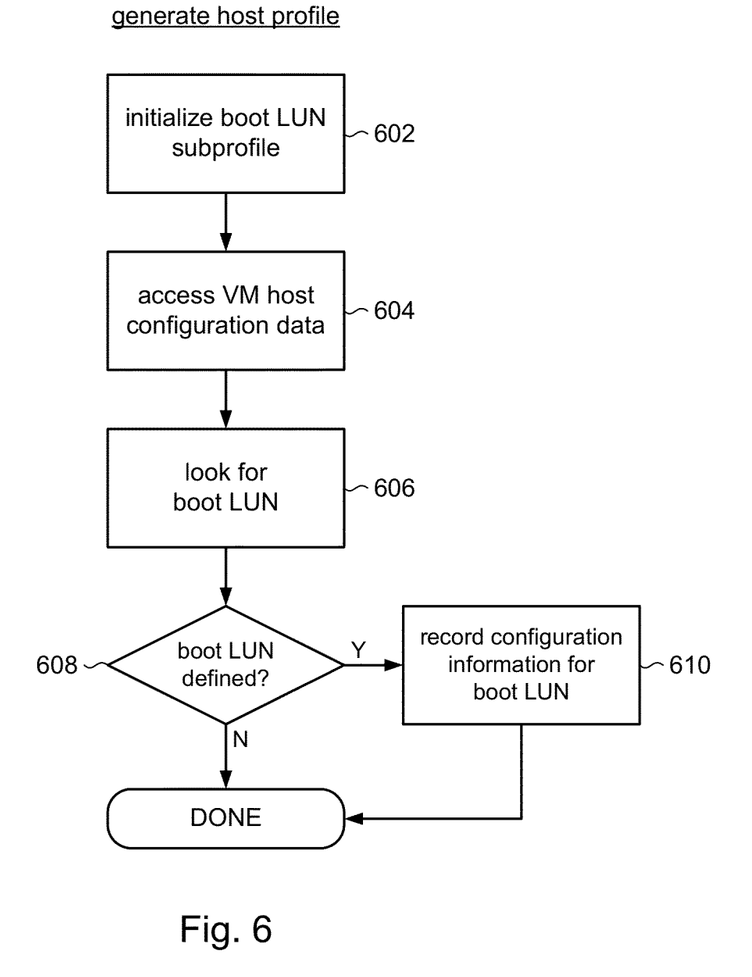
FIG. 6 illustrates an example of a workflow for generating a host profile.

FIG. 6 illustrates processing to generate or otherwise create a host profile from a host machine (the reference host) in accordance with the present disclosure. The processing, for example, may be performed by the application 428 (FIG. 4A) in the management system 110 for generating host profiles. For explanation purposes, it will be convenient to assume that the management server 110 creates the host profile, although it will be appreciated that in other embodiments, the host profile may be created by an agent (not shown) other than the management server.

As explained above, in accordance with the present disclosure, the host profile (e.g., 102) may include a boot LUN subprofile (e.g., 302a, FIG. 3) to hold information relating to a boot disk that resides on a SAN. In block 602, the management server 110 may initialize the boot LUN subprofile, for example, to NULL.

In block 604, the management server 110 may access the configuration data on the reference host to compile the host profile. The received configuration data may be stored in one or more of the subprofiles that comprise the host profile, or may be used to generate or otherwise produce data that is stored in one or more of the subprofiles.

In block 606, the management server 110 may scan or otherwise look for the presence of configuration data received from the reference host that indicates the data relates to a boot disk that exists as a LUN device on a SAN. If, in block 608, a boot LUN is detected, then at block 610 the management server 110 may store the configuration data relating to the boot LUN in the boot LUN subprofile. The resulting host profile may be used as a reference for assessing the configurations of other host machines. In other embodiments, configuration data may be captured for any boot disk, whether a local boot disk, a SAN disk, etc.

Figure 7:
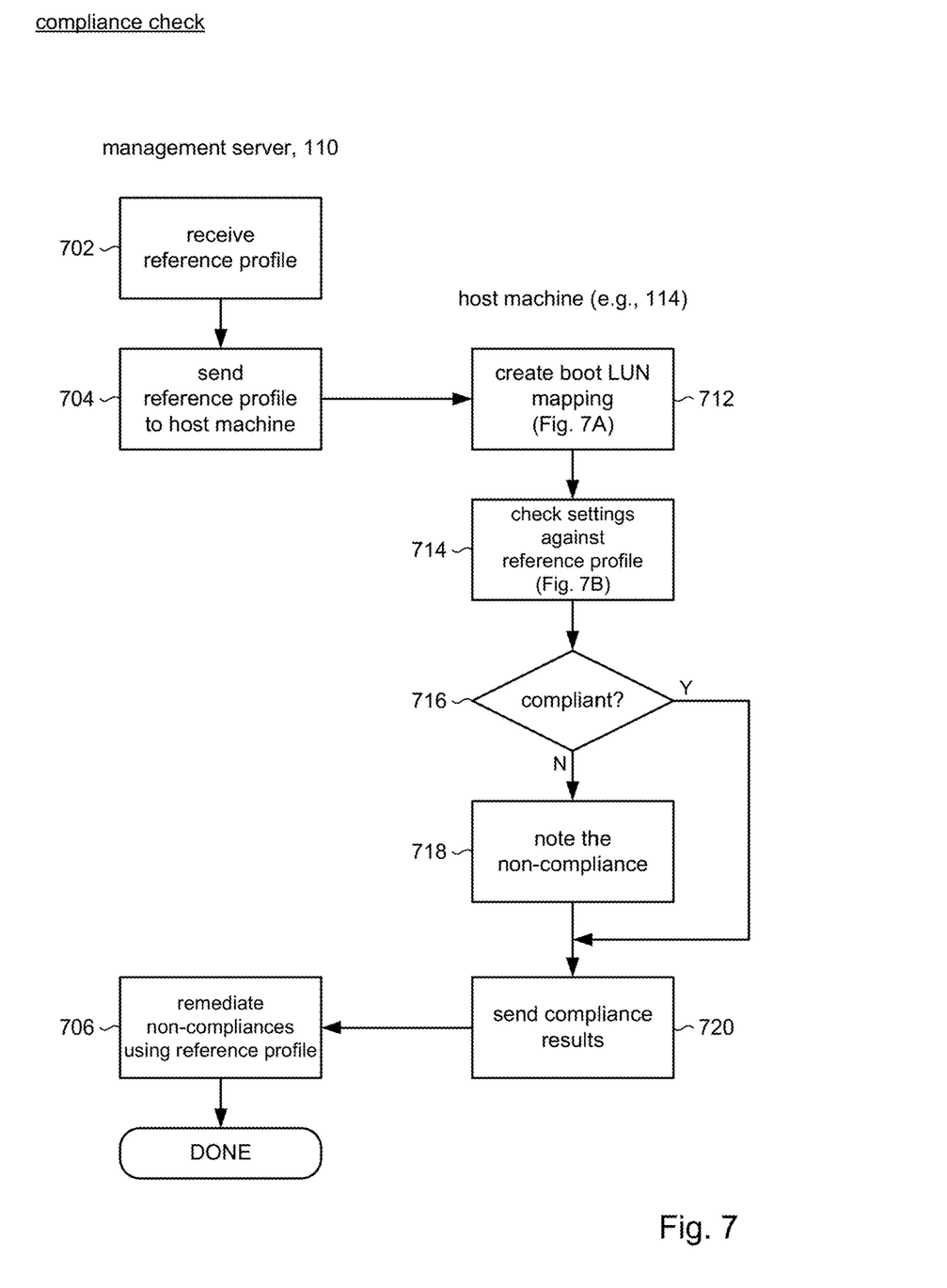
FIGS. 7, 7A and 7B illustrate workflows for using a host profile.

FIG. 7 illustrates processing in accordance with the present disclosure to perform compliance checking on the configuration of a host machine (the target host machine) using a host profile (the reference profile) generated in accordance with FIG. 6. The processing, for example, may be performed by the application 430 (FIG. 4A) in the management server 110. For explanation purposes, it will be convenient to assume that the management server 110 performs compliance checking; although it will be appreciated that in other embodiments, compliance checking may be performed by an agent (not shown) other than the management server.

At block 702, the management server 110 may receive a reference profile (e.g., host profile 102) to serve as a reference to assess the configurations in a given target host machine. In some embodiments, for example, the user (e.g., administrator) may manually initiate a compliance check operation, including providing or otherwise identifying the reference profile to use. In other embodiments, the management server 110 may access a previously stored reference profile, for example, so that the management server can periodically perform compliance checking on its host machines.

At block 704, the management server 110 may send the reference profile to each host machine (e.g., 114, 1160 in the datacenter, along with a compliance initiate command, to cause each host machine to perform a compliance workflow.

At block 712, the host machine, in accordance with the present disclosure, may create a boot LUN mapping. Basically, the boot LUN mapping maps a boot LUN that may be specified in the reference profile to a boot LUN that may be used by the target host machine. Additional details of this aspect of the present disclosure will be discussed below.

At block 714, the host machine may access each of its settings and assess them for compliance by comparing them against corresponding configuration settings in the reference profile. If a given configuration setting in the reference profile relates to a boot LUN of the host machine, then the host machine may employ the boot LUN mapping so that the boot LUN referenced in the given configuration setting is properly assessed against the actual boot LUN in the host machine rather than the boot LUN specified in the reference profile. This aspect of the present disclosure will be discussed in more detail below.

If at block 716 all configuration settings are deemed to be compliant, then processing may continue to block 720 where a report or other information of the compliance check can be sent back to the management server 110. If any setting is non-compliant, then at block 718 the host machine may note the non-compliance(s) in the report. Processing may then proceed to block 720.

At block 706, the management server 110 may remediate non-compliant settings noted in loop 706. In some embodiments, the management server 110 may take remedial action by logging errors, sending messages or report, or otherwise informing to user one or more of the non-compliant settings. In other embodiments, remediation by the management server 110 may include autonomously performing corrective action to bring the non-compliant settings into compliance.

Figure 7A:
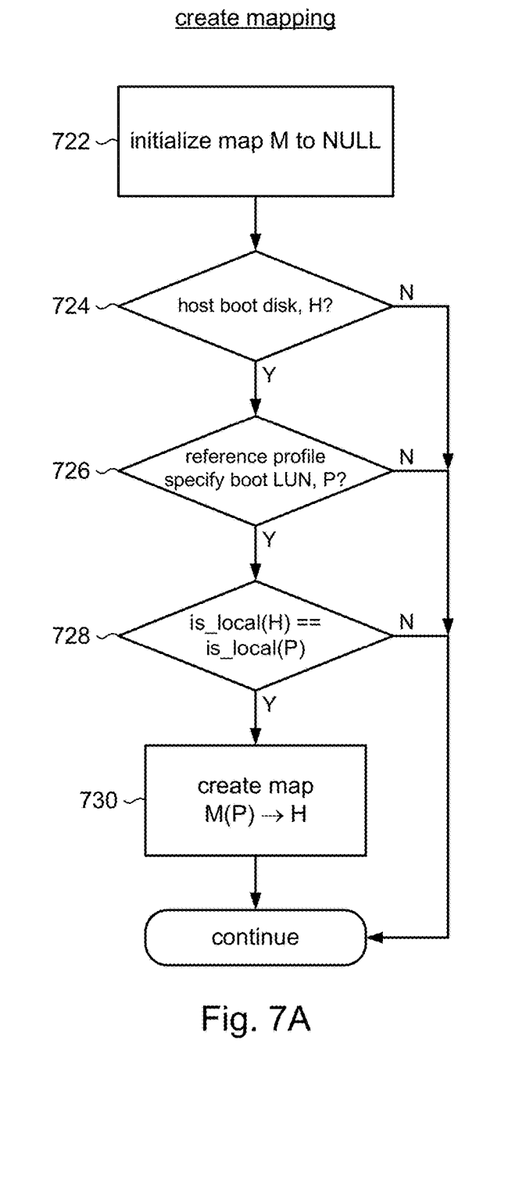

Processing to create a boot LUN mapping (block 712 in FIG. 7) in accordance with the present disclosure will now be explained. Referring to FIG. 7A, in block 722, the host machine may initialize a map M to NULL. In block 724, if the host machine contains a boot disk (call it "H"), then processing proceeds to block 726. Otherwise, processing continues at block 706 in FIG. 7, and map M remains NULL. For example, if the host machine is network booted (e.g., using a known protocol such as the PXE boot protocol), then there would be no boot disk.

In block 726, if the reference profile specifies a boot LUN (call it "P"), then processing proceeds to block 728. Otherwise, processing continues at block 706 in FIG. 7, and map M remains NULL.

In block 728, the host machine may assess the "localness" of H and P. In accordance with the present disclosure, localness indicates whether a device can be shareable or not, irrespective of how it is actually configured. To understand the property of localness, consider a cluster of host computers H1 and H2. Suppose disk L1 and disk S1 are attached to host computer H1, and disk L2 and disk S1 are attached to another host computer H2 in the same cluster. Disk S1 is considered to be a "shared device" as it is visible to both H1 and H2. Localness can be represented, as shown in FIG. 7A, with a function is_local( ) Accordingly, is_local(S1) would evaluate to FALSE since disk S1 is not local to host computer H1 or H2, but rather is shared between H1 and H2. Suppose that L1 and L2 are both shareable devices (e.g., on a SAN), but have been configured by an administrator so they are visible only to one host in the cluster, namely H1 and H2 respectively in our example, despite being on a SAN. So disk L1 is visible only to host H1 and disk L2 is visible only to H2. In this case, the function is_local( ) would also evaluate to FALSE for both L1 and L2 because they are shareable devices, even though they are configured to be not shared.

On the other hand, suppose disk L1 is a local device (not part of the SAN) that is directly attached only to host H1. In other words, disk L1 cannot be shared by multiple hosts. In this case, is_local(L1) would evaluate to TRUE because disk L1 is truly a local disk. Disk L2, however, would still evaluate to FALSE because it is shareable, though configured to be visible only to host H2.

Continuing with FIG. 7A, in block 728, if the host machine has a boot disk H that is a SAN LUN, then the expression is_local(H) will evaluate to FALSE because, although H is generally shareable, in this particular configuration it is configured only to be visible to the target host machine as its boot disk. If the reference profile also specifies a boot disk P that is a SAN LUN, then the expression is_local(P) will also evaluate to FALSE for the same reason. Disks H and P are said to have the same localness. Similarly, disks H and P are said to have the same localness if H is a local drive accessible only by the target host machine and P is a local drive accessible only by the host machine that provided the reference profile; the expressions is_local(H) and is_local(P) will evaluate to TRUE. In accordance with the present disclosure, when the localness of both H and P are the same, the map M will be updated in block 730 in order to map disk P to disk H. The map M may be transient data that is valid only during the workflow for assessing a given target host machine. When block 704 in FIG. 7 is repeated for the next target host machine, a new map M may be created.

Figure 7B:
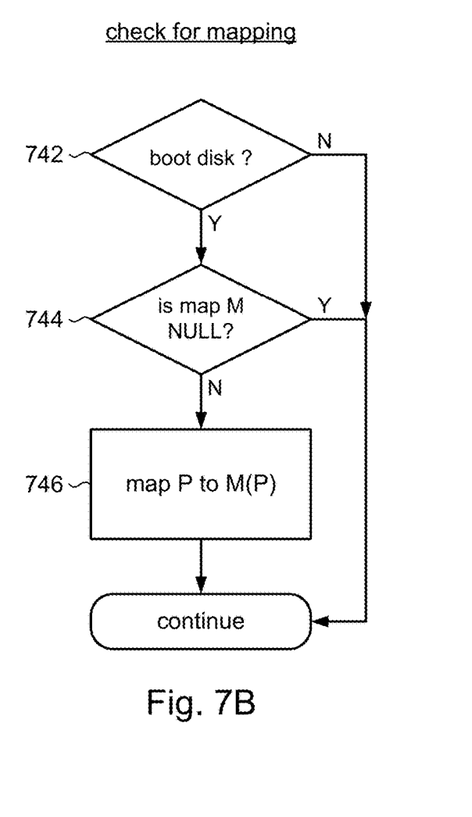

Processing to use the boot LUN mapping in accordance with the present disclosure will now be explained. As mentioned, the host machine may perform this action at block 714 in FIG. 7 as part of checking the compliance of a given setting in the target host machine. Referring to FIG. 7B, at block 742, the host machine may determine whether the given host machine setting being assessed relates to a boot disk. If the given host machine setting being assessed relates to a boot disk, then at block 744, the host machine may determine whether there is a non-null map M. If there is such a map M, then at block 746 the host machine will use the mapped value provided by map M when assessing the given setting for compliance.

Host profiles in accordance with the present disclosure can correctly assess settings in the target host machine being assessed for compliance. In particular, when the target host machine uses a boot LUN on SAN storage, the compliance check will perform correctly despite that the host profile refers to a different boot LUN. The mapping capability in accordance with the present disclosure can correctly identify the boot LUN in the target host machine and use that boot LUN instead of the boot LUN specified in the host profile. Thus, for example, in the host profile 102, the boot disk is identified as "ABC." When a target host machine (e.g., 114) is being assessed for compliance with the host profile 102, a map M in accordance with FIG. 7A may be created to map the boot disk identifier "ABC," referenced in the host profile, to the disk identifier "JKL" of the boot disk in host machine 114. When a setting in the target host machine involves its boot disk, the boot disk identifier "ABC" referenced in the host profile will be mapped to the identifier "JKL" in accordance with FIG. 7B so that the setting in the target host machine can be properly assessed for compliance.

Host profiles in accordance with the present disclosure allow a user (e.g., administrator) to make changes in a host profile that can correctly propagate to host machines in a cluster. In particular, when the user makes changes to a setting in the boot LUN subprofile of a host profile, those changes can be translated in accordance with FIGS. 7A and 7B to settings in the boot LUN of the target host machine so that the boot LUN in the target host machine is used instead of the boot LUN in the reference host.

Figure 7C:
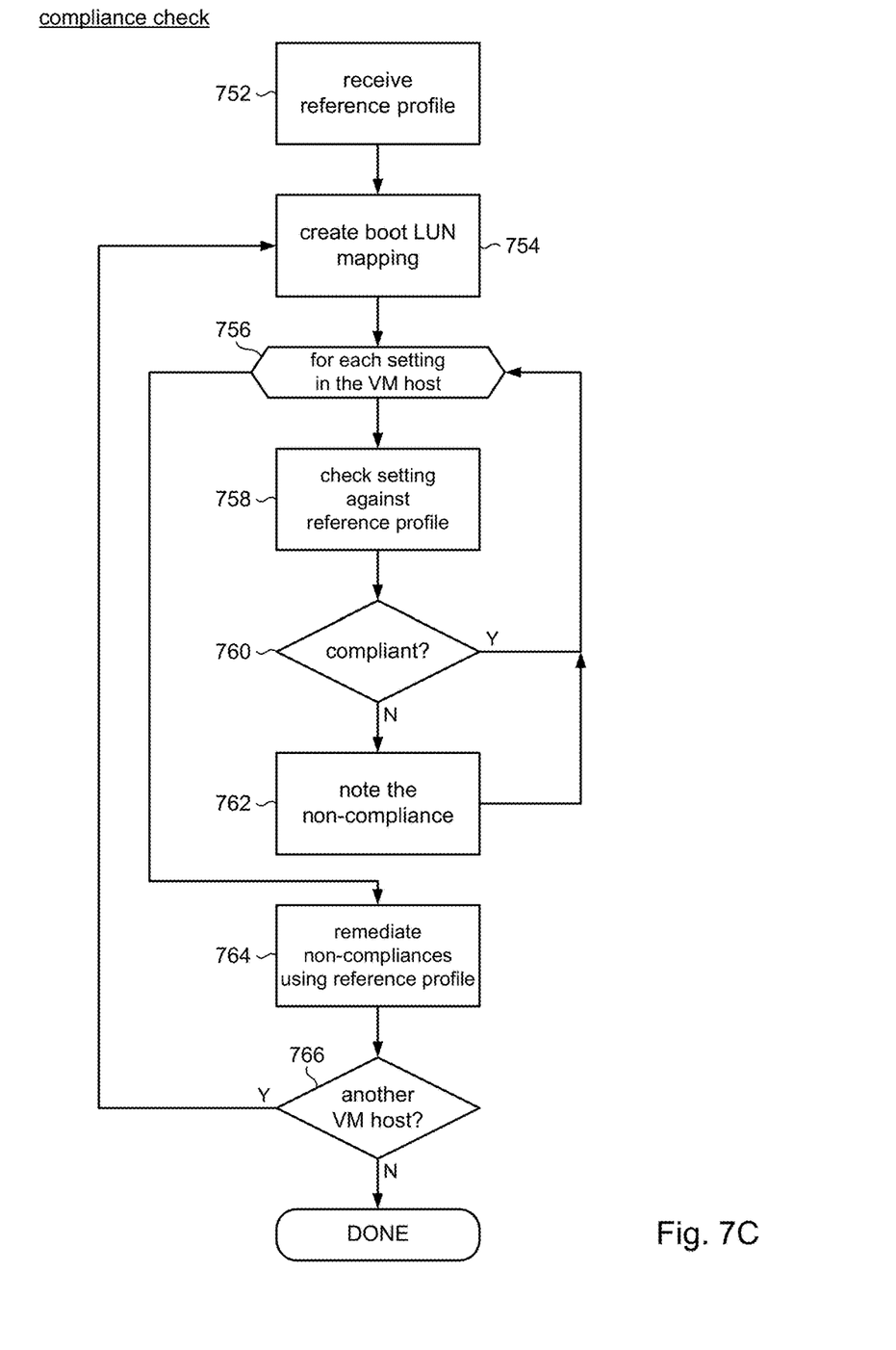
FIG. 7C illustrates another workflow for using a host profile.

FIG. 7C illustrates an alternative compliance check workflow in accordance with the present disclosure. Whereas the workflow in FIG. 7 occurs largely in the host machine (e.g., 114), the workflow shown in FIG. 7C occurs largely in the management server 110. The processing, for example, may be performed by the application 430 (FIG. 4A) in the management server 110. For explanation purposes, it will be convenient to assume that the management server 110 performs compliance checking; although it will be appreciated that in still other embodiments, compliance checking may be performed by an agent (not shown) other than the management server.

At block 752, the management server 110 may receive a reference profile (e.g., host profile 102) to serve as a reference to assess the configurations in a given target host machine. In some embodiments, for example, the user (e.g., administrator) may manually initiate a compliance check operation, including providing or otherwise identifying the reference profile to use. In other embodiments, the management server 110 may access a previously stored reference profile, for example, so that the management server can periodically perform compliance checking on its host machines.

At block 754, the management server 110, in accordance with the present disclosure, may create a boot LUN mapping. Basically, the boot LUN mapping maps a boot LUN that may be specified the reference profile to a boot LUN that may be used by the target host machine. This aspect of the present disclosure is similar to the workflow shown in FIG. 7A, but performed by the management server 110.

The management server 110 may iterate a loop 756 for each configurable setting in the target host machine. At block 758, the management server 110 may access a given setting from the target host machine. The given setting may then be assessed for compliance by comparing it against the configuration data stored in the subprofile (of the reference profile) that corresponds to that setting. If the given setting relates to a boot LUN of the target host machine, then the management server 110 may employ the boot LUN mapping so that the boot LUN referenced in the given setting is properly assessed against the actual boot LUN in the target host machine rather than the boot LUN specified in the reference profile. This aspect of the present disclosure is similar to the workflow shown in FIG. 7B, but performed by the management server 110.

If at block 760 the setting is deemed to be compliant, then the loop 756 may continue with the next setting in the target host machine. If the setting is non-compliant, then at block 762 the management server 110 may note the non-compliance for subsequent remedial action, and then continue with the next setting in the target host machine.

At block 764, the management server 110 may remediate non-compliant settings noted in loop 756. In some embodiments, the management server 110 may log errors, send messages, or otherwise report to the user one or more of the non-compliant settings. In other embodiments, the management server 110 may autonomously perform remedial action to bring the non-compliant settings into compliance.

At block 766, the management server 110 can repeat the compliance checking on another host machine in the datacenter.

In FIG. 7C, the remediation in block 764 is performed after each target host machine is assessed. In other embodiments, the remediation may be delayed until after all of the host machines have been assessed.

Figure 8A:
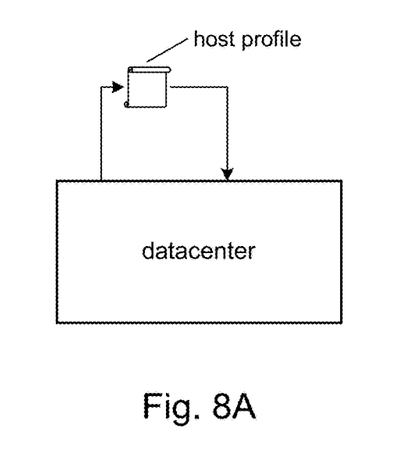
FIGS. 8A and 8B illustrate that host profiles may be used in one or more datacenters.
Figure 8B:
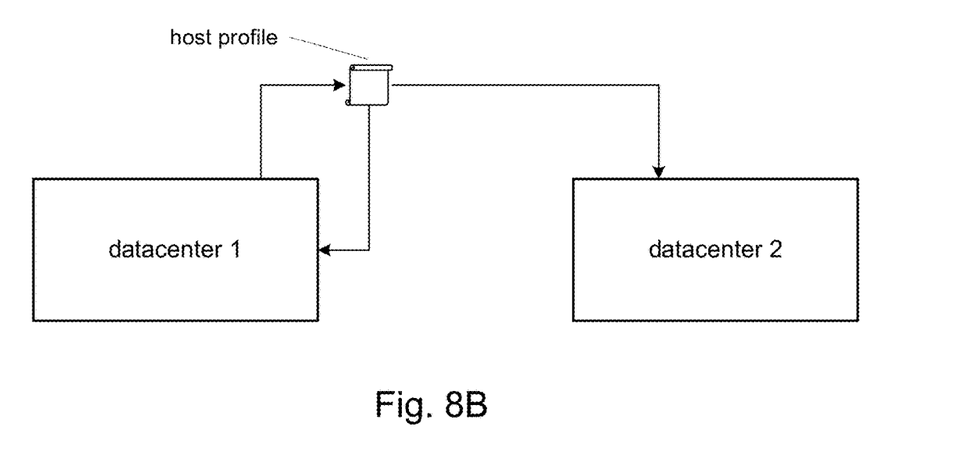

As the foregoing figures show, a host profile may be generated in a given cluster of host machines in a datacenter, and then used in that datacenter; e.g., to deploy and monitor host machines in that datacenter. FIG. 8A illustrates this configuration schematically. It is noted that in other embodiments, a host profile may be developed in a first datacenter using a reference host machine in that first datacenter. The host profile may then be used to deploy and monitor host machines in a second datacenter separate from the first datacenter, in addition to deploying and monitoring host machines in the first datacenter. FIG. 8B schematically illustrates this configuration.

The foregoing description has used SAN storage to illustrate principles of the present disclosure. It will be appreciated that embodiments in accordance with the present disclosure can be based on storage configurations other than SAN storage. In some embodiments, for example, compliance checking may be conducted in a configuration that uses local boot disks rather that network-based disks such as SANs. Thus, the host profile may refer to a local boot disk that is local to the reference host. The host profile may then be used to assess the compliance of respective local boot disks in other host machines.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a virtualization system comprising:
    receiving, by a first computer, a reference profile to assess configuration of the first computer for compliance with the reference profile, the first computer associated with a target boot disk used to start the first computer, the reference profile including an identifier of a reference boot disk;
    assessing, by the first computer, compliance with the reference profile by comparing configuration settings in the reference profile with corresponding configuration settings of the first computer, including:
        setting a boot LUN identifier, wherein the boot LUN identifier is set to an identifier of the target boot disk when the reference boot disk is accessible only by a reference computer and the target boot disk is accessible only by the first computer,
    wherein the boot LUN identifier is set to an identifier of the reference boot disk otherwise; and
        comparing the boot LUN identifier to the identifier of the target boot disk, wherein non-compliance occurs when the identifier of the target boot disk does not match the boot LUN identifier; and
    initiating remedial action in a management sever, by the first computer, in response to non-compliance of the configuration settings of the first computer with the reference profile.

2. The method of claim 1 wherein the configuration settings in the reference profile are based on configurations in the reference computer, wherein the reference boot disk is used to start the reference computer.

3. The method of claim 2 wherein the reference computer and the first computer are host machines in a datacenter that support virtual machines.

4. The method of claim 2 wherein the reference computer is a host machine in a first datacenter and the first computer is a host machine in a second datacenter.

5. The method of claim 1 wherein the first computer receives the configuration settings in the reference profile from the management server in a datacenter.

6. The method of claim 1 wherein the target boot disk has stored thereon information used to boot up the first computer.

7. The method of claim 1 wherein the reference boot disk is a first logical unit number (LUN) device on storage area network (SAN).

8. The method of claim 7 wherein the target boot disk is a second LUN device on the SAN, different from the first LUN device.

9. The method of claim 1 further comprising creating an association between an identifier of the reference boot disk specified in the configuration settings in the reference profile and an identifier of the target boot disk used by the second computer.

10. The method of claim 1 wherein the assessing selectively uses the target boot disk depending on a localness of the target boot disk and a localness of the reference disk specified in the configuration settings in the reference profile.

11. A computer system in a virtualization system comprising:
    a processor;
    a memory;
    a target boot disk used to boot the computer system; and
    a data store having stored thereon computer executable program code, which when executed by the processor causes the processor to:
    receive a reference profile that is representative of configurations of a reference computer system, the reference profile an identifier of a reference boot disk;
    assess compliance with the reference profile, including:
        comparing configuration settings in the computer system with configuration settings in the reference profile, including:
            setting a boot LUN identifier, wherein the boot LUN identifier is set to an identifier of the target boot disk when the reference boot disk is accessible only by the reference computer system and the target boot disk is accessible only by the computer system, wherein the boot LUN identifier is set to an identifier of the reference boot disk otherwise; and
            comparing the boot LUN identifier to the identifier of the target boot disk, wherein non-compliance occurs when the identifier of the target boot disk does not match the boot LUN identifier; and
    initiate a remedial action in a management sever, by the first computer, in response to non-compliance of the configuration settings of the first computer with the reference profile.

12. The computer system of claim 11 wherein the computer system and the reference computer system is in a common datacenter.

13. The method of claim 11 wherein the reference boot disk is a first LUN device on a SAN and the target boot disk is a second LUN device on the SAN different from the first LUN device.

14. The computer system of claim 11 the reference boot disk is a local boot disk on the reference computer system.

15. The computer system of claim 14 the target boot disk is a local boot disk on the computer system.

16. The computer system of claim 11 wherein the computer executable program code, which when executed by the processor, further causes the processor to create an association between the identifier of the reference boot disk specified in the reference profile and the identifier of the target boot disk of the computer system.

17. The computer system of claim 11 wherein the reference boot disk is used to start the reference computer.

18. A non-transitory computer storage medium having stored thereon computer executable program code, which when executed by a computer, causes the computer to perform steps comprising:
 receiving a reference profile to assess configuration of the computer for compliance with the reference profile, the computer associated with a target boot disk used to start the computer, the reference profile including an identifier of a reference boot disk;
 assessing compliance with the reference profile by comparing configuration settings in the reference profile with corresponding configuration settings of the first computer, including:
  setting a boot LUN identifier, wherein the boot LUN identifier is set to an identifier of the target boot disk when the reference boot disk is accessible only by a reference computer and the target boot disk is accessible only by the first computer, wherein the boot LUN identifier is set to an identifier of the reference boot disk otherwise; and
  comparing the boot LUN identifier to the identifier of the target boot disk, wherein non-compliance occurs when the identifier of the target boot disk does not match the boot LUN identifier; and
 initiating remedial action in a management sever in response to non-compliance of the configuration settings of the first computer with the reference profile.

19. The non-transitory computer storage medium of claim 18 wherein the configuration settings in the reference profile are based on configurations in a reference computer.

20. The non-transitory computer storage medium of claim 19 wherein the reference computer and the computer are host machines in a datacenter.

21. The non-transitory computer storage medium of claim 18 wherein the reference boot disk is a first logical unit number (LUN) device on storage area network (SAN) and the target boot disk is a second LUN device on the SAN, different from the first LUN device.

22. The non-transitory computer storage medium of claim 19 wherein the reference boot disk is used to start the reference computer.

* * * * *